US012717802B2

(12) United States Patent
Ebel et al.

(10) Patent No.: US 12,717,802 B2
(45) Date of Patent: Aug. 25, 2026

(54) SYSTEMS AND METHODS FOR SEMANTIC QUERY PROCESSING

(71) Applicant: Salesforce, Inc., San Francisco, CA (US)

(72) Inventors: Lior Ebel, Tel Aviv (IL); Jonathan Alden Drake, Shoreline, WA (US); Trevor Hall, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/043,379

(22) Filed: Jan. 31, 2025

(65) Prior Publication Data

US 2026/0079954 A1 Mar. 19, 2026

Related U.S. Application Data

(60) Provisional application No. 63/694,892, filed on Sep. 15, 2024.

(51) Int. Cl.
*G06F 16/00* (2019.01)
*G06F 16/2455* (2019.01)
*G06F 16/248* (2019.01)

(52) U.S. Cl.
CPC ...... *G06F 16/248* (2019.01); *G06F 16/24553* (2019.01)

(58) Field of Classification Search
CPC ......................... G06F 16/248; G06F 16/24553
USPC ................................................. 707/600–899
See application file for complete search history.

(56) References Cited

U.S. PATENT DOCUMENTS 12,259,902 B1 * 3/2025 Tsoungui .............. G06F 16/254
2018/0173750 A1 * 6/2018 Dumant .............. G06F 16/2448
2020/0334233 A1 * 10/2020 Lee ........................ G06N 3/045
2021/0034615 A1 * 2/2021 Chen ................... G06F 16/9024
2022/0092069 A1 * 3/2022 Hartsing ........... G06F 16/24544
2023/0418811 A1 * 12/2023 Xiong ................. G06F 16/2379
2024/0394251 A1 * 11/2024 Brende ............ G06F 16/24522

* cited by examiner

*Primary Examiner* — Michelle N Owyang
(74) *Attorney, Agent, or Firm* — Morgan, Lewis & Bockius LLP

(57) ABSTRACT

A semantic query processing system enables data analytics through a metadata-driven architecture. The system processes analytical queries through a layered execution path that maintains consistent logic across system components. For incoming semantic queries, the system coordinates processing between semantic and storage layers instead of, or in addition to, requiring pre-materialized calculations. A gateway service receives semantic queries while a query preparer generates execution plans based on semantic model metadata defining relationships, measures, and dimensions. A query generator transforms these plans into optimized SQL operations, with complex calculations handled through post-processing. The system reduces analytical complexity by eliminating pre-calculation requirements, enables real-time metric computation through coordinated query processing, and maintains semantic consistency through metadata-driven execution. This architecture achieves improved response times for complex metrics while preserving consistent calculation logic across distributed components.

20 Claims, 13 Drawing Sheets

SYSTEMS AND METHODS FOR SEMANTIC QUERY PROCESSING

RELATED APPLICATIONS

This application claims priority to U.S. Provisional Application Ser. No. 63/694,892, filed Sep. 15, 2024, entitled "Computer Systems and Methods for Defining a Temporal Relationship Over Dimensions for Simple Visualization," which is incorporated by reference herein in its entirety.

TECHNICAL FIELD

The disclosed implementations relate generally to data analytics and distributed computing systems and more specifically to systems, methods, and architectures for processing and optimizing semantic queries across data sources.

BACKGROUND

Data analytics environments face significant technical challenges when enabling users to analyze complex data at scale. Systems must solve the intricate problem of translating high-level queries into optimized database operations while handling complex calculations that cannot be pre-computed. Standard approaches require materializing all combinations of metrics and dimensions in advance, leading to storage growth and stale data. This creates fundamental performance constraints when analyzing metrics like return on investment or market share across multiple dimensions, as the number of potential calculation paths grows with each additional dimension or measure. The challenge is magnified by the need to maintain consistent logic across both exploratory analysis and production applications while processing queries against billions of rows in real-time. Systems must also handle sophisticated analytical operations that cannot be expressed in SQL alone, requiring careful orchestration between database and application-layer processing. This creates inherent tensions between providing the flexibility needed for ad-hoc analysis, maintaining consistent semantic definitions across the platform, and delivering improved (e.g., sub-second) query performance at massive scale. Additional complexity arises from the need to optimize query execution paths based on data volumes, calculation complexity, and/or access patterns while ensuring that logic remains consistent regardless of how the data is accessed.

SUMMARY

There is a need for a semantic query processing system that can efficiently handle complex data analytics while maintaining consistent logic across distributed components. The disclosed system solves the problem of dynamic metric calculation by introducing a metadata-driven architecture that processes queries across semantic and storage layers. For complex calculations that cannot be pre-materialized, the system implements a specialized query processing path that dynamically optimizes execution between SQL and post-processing operations. Some implementations use a semantic engine that translates high-level concepts into optimized query plans while maintaining consistent calculation logic across all access patterns. In some implementations, the system includes a semantic data model that defines entity relationships and metrics, a query preparation component that determines optimal execution strategies, a SQL generation service that creates efficient database operations, and/or a post-processing engine that handles complex analytical functions.

The disclosed system provides several technical improvements over conventional analytics platforms. For example, the system reduces storage requirements by eliminating or reducing the need for materialized pre-calculations by using a dynamic computation model that achieves similar performance with significantly less data duplication. Additionally, the coordinated processing of semantic queries across components enables improved response times for complex calculations against billions of rows, achieved through query optimization that maintains consistency without requiring complete data materialization. Furthermore, the system improves query efficiency by determining optimal execution paths across semantic layers before processing begins, eliminating redundant calculations and reducing operational overhead. Additional technical benefits include reduced system complexity through unified semantic handling, improved system scalability through independent processing across components, and enhanced system reliability through query planning that enables precise optimization of calculation paths. The system's unified semantic interface also reduces application complexity by abstracting the underlying query mechanisms, resulting in simplified client implementations and reduced maintenance overhead.

In accordance with some implementations, a method executes at a computing device having one or more processors, and memory storing one or more programs configured for execution by the one or more processors. The method for processing semantic queries includes receiving, by a gateway service, a semantic query for analytical data processing. The method also includes retrieving metadata from a semantic data model that defines relationships between data objects and calculation rules. The semantic data model includes semantic model objects storing definitions for table relationships, measures, and dimensions. The method also includes generating, by a semantic query preparer, a query execution plan through several steps. The semantic query preparer maps the semantic query to the retrieved metadata. The semantic query preparer also constructs a dependency graph of the semantic model objects needed to process the semantic query. The semantic query preparer also identifies calculations requiring post-processing. The method also includes transforming, by a query generator, the query execution plan into SQL queries based on the dependency graph and the identified calculations. The method also includes executing the SQL queries to obtain query results. The method also includes performing post-processing operations on the query results according to the identified calculations that could not be executed in SQL. The method also includes returning the processed query results.

In some implementations, generating the query execution plan includes analyzing the semantic query to identify required tables. The method also includes traversing the dependency graph to determine an optimal join order. The method also includes identifying measures requiring pre-aggregation. The method also includes determining aggregation levels based on dimension hierarchies.

In some implementations, determining the optimal join sequence includes analyzing cardinality information from the retrieved metadata. The method also includes evaluating filter selectivity. The method also includes generating a cost-based join path through the dependency graph.

In some implementations, transforming the query execution plan includes generating FROM clauses based on the dependency graph. The method also includes generating SELECT clauses incorporating measure calculations. The method also includes generating GROUP BY clauses based on dimension hierarchies. The method also includes optimizing the SQL queries based on database capabilities.

In some implementations, transforming the query execution plan includes generating subqueries for identified complex measure calculations. The method also includes ordering the subqueries based on measure dependencies. The method also includes incorporating the subquery results into final SQL generation.

In some implementations, performing post-processing operations includes executing complex analytical functions not supported by SQL. The method also includes performing multi-pass calculations requiring intermediate results. The method also includes applying hierarchical rollups across dimensions. The method also includes formatting results according to measure definitions.

In some implementations, retrieving metadata includes accessing a metadata store containing semantic model object definitions. The method also includes loading relationship definitions specifying join conditions between tables. The method also includes loading measure definitions specifying calculation formulas and aggregation rules. The method also includes loading dimension definitions specifying hierarchical grouping structures.

In some implementations, the relationship definitions include source and target table identifiers. The relationship definitions also include source and target column identifiers. The relationship definitions also include join type specifications. The relationship definitions also include cardinality information. The relationship definitions also include referential integrity constraints.

In some implementations, the measure definitions include base measures identifying source columns. The measure definitions also include calculated measures specifying arithmetic formulas. The measure definitions also include aggregation rules specifying summation methods. The measure definitions also include granularity specifications identifying valid dimension combinations.

In some implementations, the dimension definitions include creating dimension hierarchies based on the retrieved metadata. The method also includes associating hierarchies with corresponding measures. The method also includes validating aggregation paths through the dependency graph. The method also includes generating level-based aggregation instructions.

In some implementations, executing multi-pass calculations includes storing intermediate results from SQL query execution. The method also includes applying subsequent calculation passes based on measure definitions. The method also includes maintaining calculation context across processing steps. The method also includes aggregating the results according to dimension hierarchies.

In some implementations, maintaining calculation context includes tracking measure aggregation states. The calculation context also includes preserving dimension hierarchy positions. The calculation context also includes managing running calculations across result sets.

In some implementations, the method includes monitoring execution metrics during query processing. The method also includes storing metrics in an execution statistics repository. The method also includes using stored metrics to optimize subsequent query execution plans.

In some implementations, optimizing subsequent query execution plans includes analyzing cached execution statistics. The method also includes modifying join sequences based on actual performance. The method also includes adjusting calculation ordering based on observed costs.

In some implementations, the method includes validating security permissions before metadata retrieval. The method also includes applying security filters during query transformation. The method also includes maintaining security context through post-processing.

In some implementations, the semantic model objects include versioned metadata definitions stored in a data cloud. The semantic model objects also include cached transformation rules used by the query generator. The semantic model objects also include runtime execution contexts maintained by the semantic engine.

In some implementations, the runtime execution contexts include tracking active calculation states. The runtime execution contexts also include tracking intermediate result sets. The runtime execution contexts also include tracking dimension hierarchy positions. The runtime execution contexts also include tracking aggregation progress through query execution plan.

In some implementations, the semantic query includes measure identifiers corresponding to measure definitions. The semantic query also includes dimension paths specified according to dimension hierarchies. The semantic query also includes filter conditions applicable to the data objects. The semantic query also includes output specifications for processed query results.

Typically, an electronic device includes one or more processors, memory, a display, and one or more programs stored in the memory. The programs are configured for execution by the one or more processors and are configured to perform any of the methods described herein.

In some implementations, a non-transitory computer-readable storage medium stores one or more programs configured for execution by a computing device having one or more processors, and memory. The one or more programs are configured to perform any of the methods described herein.

Thus, methods and systems are disclosed that enable dynamic data analytics through a metadata-driven semantic architecture, accomplished by intelligent query planning, real-time translation between high-level concepts and optimized database operations, coordinated processing across semantic and storage layers, and unified handling of complex calculations, resulting in improved response times (e.g., sub-second responses) for sophisticated metrics while maintaining consistent logic across the platform.

Both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices disclosed in the present specification improve the efficiency and performance of data ingestion systems by reducing computational overhead through selective processing paths, eliminating sequential processing bottlenecks through concurrent metadata and data handling, and enabling immediate data querying through coordinated storage management, thereby advancing the technical field of distributed data processing systems beyond conventional batch-oriented architectures.

Figure 1:
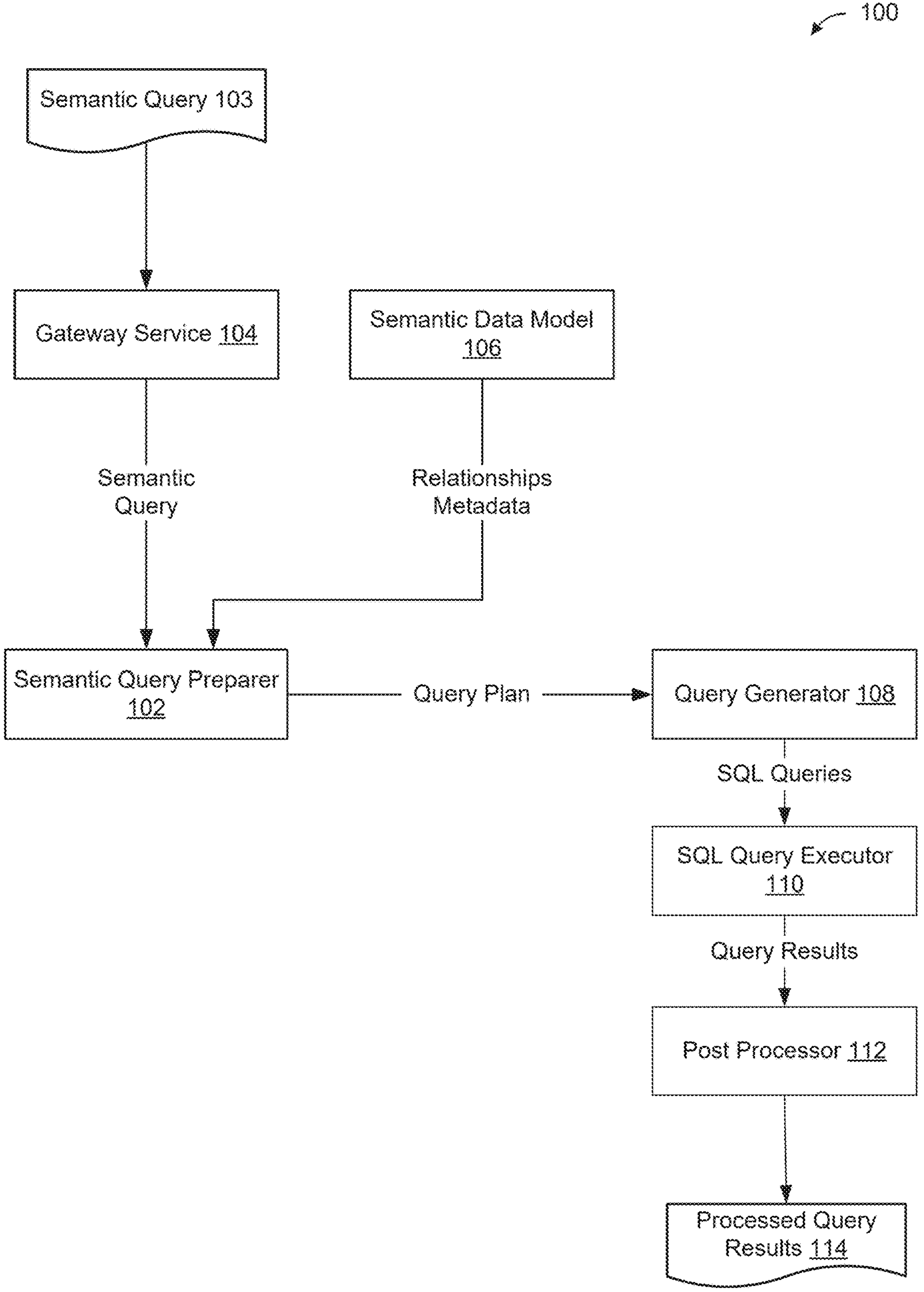
FIG. 1 is a block diagram of an example system for semantic query processing, according to some implementations.

FIG. 1 is a block diagram of an example system 100 for semantic query processing, according to some implementations. The semantic query processing system 100 enables generation of semantic queries that abstract complicated SQL generation. In some implementations, a gateway service 104 receives a semantic query 103, and sends the semantic query 103 to a semantic query preparer 102. In addition to the semantic query 103, the semantic query preparer 102 receives relationship metadata from a semantic data model (SDM) 106. The relationship metadata defines relationships between data objects and calculation rules. The SDM includes semantic model objects (SMOs) storing definitions for table relationships, measures, and dimensions. The SDM defines semantic concepts to support analytical applications (e.g., reports, dashboards). SMOs are entities which contain the logic of the semantic model. The entities can include, for example, tables, relationships (e.g., data model relationships, data cloud relationships, relationships protection and locale data, such as date formats or currency separator), dimensions, measures, goals/targets, encodings, and/or cubes. Data cloud objects can include, for example, DLOs, DMOs, and component integrations (CIs). The semantic query 103 can include real-time query parameters. A declarative domain specific language (DSL) like SQL can be used for representing a semantic query.

Based on the semantic query 103 and the relationship metadata, the semantic query preparer 102 generates a query plan and sends the query plan to a query generator 108. In some implementations, the query plan includes a mapping of the semantic query 103 to the relationship metadata, a dependency graph of semantic model objects, and/or calculations that require post processing. The query generator 108 generates one or more SQL queries, which are sent to a SQL query executor 110. The SQL query executor 110 executes the one or more SQL queries, and outputs one or more corresponding query results to a post processor 112, which performs one or more post-processing operations to the one or more query results. The one or more post-processed query results are output and/or returned as post-processed query results 114.

Figure 2:
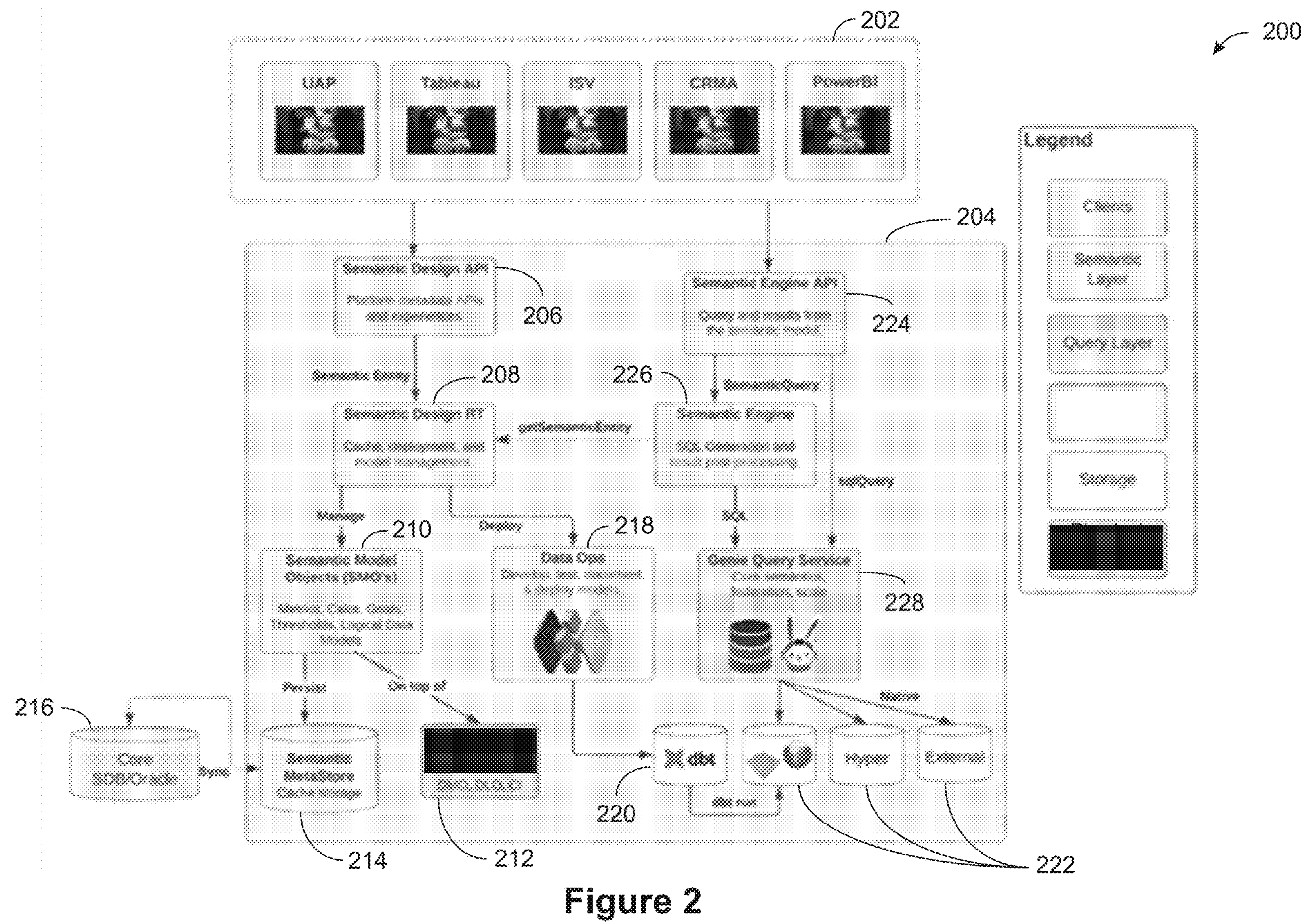
FIG. 2 is a block diagram of an example architecture for semantic query processing, according to some implementations.

FIG. 2 is a block diagram of an example architecture 200 for semantic query processing, according to some implementations. One or more clients 202 (e.g., UAP, Tableau, ISV, CRMA, Power BI) are coupled to a semantic processing system 204, which provides semantic query processing. The semantic processing system 204 includes a semantic design API 206, a semantic design runtime (RT) 208, semantic model objects (SMOs) 210, physical model objects 212, semantic meta-store 214, a core database 216, data ops 218, one or more storage devices 222, a semantic engine API 224, a semantic engine 226, and/or a query service 228. In some implementations, a semantic layer includes the semantic design API 206, the semantic design RT 208, the semantic model objects 210, the data ops 218, the semantic engine API 224, and/or the semantic engine 226. In some implementations, the semantic layer includes an SDM that includes SMOs, and a semantic engine, which queries a semantic model data cloud and/or other sources, based on a semantic query and the SDM metadata.

In some implementations, the semantic design API 206 receives information (e.g., a semantic entity) from the one or more clients 202. The semantic design API 206 includes, for example, platform metadata APIs and/or experiences. The semantic design API 206 sends the semantic entity to the semantic design RT 208. The semantic design RT 208 performs caching, model deployment, and model management. As shown in FIG. 2, the semantic design RT 208 manages the SMOs 210, which include, for example, metrics, calculations, goals, thresholds, and logical data models. These SMOs 210 are on top of the physical model objects 212, which includes, for example, data model objects (DMO), data lake objects (DLO), calculated insights (CI), and other physical model objects.

In some implementations, the SMOs 210 also persist in the semantic meta-store 214 (e.g., a cache storage). The semantic meta-store 214 synchronizes (either on-demand or scheduled) with a core database 216. The semantic design RT 208 also deploys semantic model objects to data ops 218, which may develop, test, document, and/or deploy models. Output from data ops and/or the models may be stored in a data build tool (DBT) 220, which is a tool that integrates with the data ops 218 to manage the lifecycle of data models (e.g., from development and testing through documentation and deployment) by allowing data teams to write, test, and organize SQL-based transformations in a way that follows software engineering best practices. After the data build tool run, the results (e.g., tables and views) are stored in one or more databases 222 (e.g., native databases).

In some implementations, the semantic design RT 208 supports APIs configured to create, read, update, and/or delete (CRUD) relationship objects (e.g., object(s) representing relationships for a data cloud tenant), calculated fields, logical data model based on a list of the DMO, DLO, and/or CI fields and/or calculated fields.

Information from the one or more clients 202 is also sent to the semantic engine API 224, which may query and retrieve results from a semantic model. The semantic engine API 224 sends the semantic query to a semantic engine 226. The semantic engine 226 may generate an SQL query and post-process the results of the SQL query. The semantic engine 226 may retrieve the semantic entity from the semantic design RT 208. The semantic engine 226 sends the generated SQL query to a query service 228 (sometimes referred to as a query layer). The query service 228 sends and/or stores the results of the SQL query to one or more databases 222. In some implementations, the semantic engine API 224 may directly send the SQL query to the query service 228. For example, the semantic engine API 224 may send the SQL query to the query service 228 without the semantic engine 226.

Figure 3:
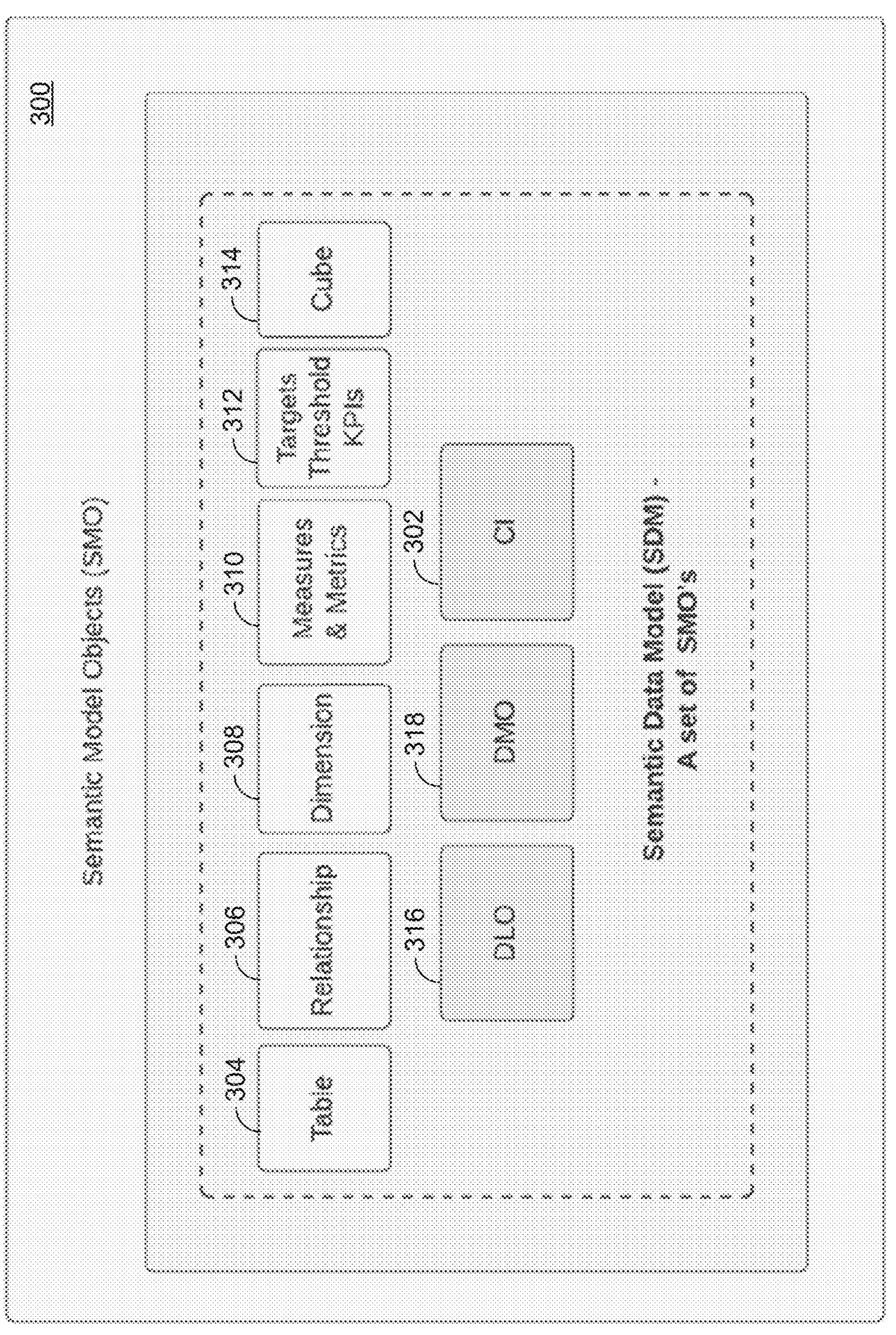
FIG. 3 is a block diagram of an example set of semantic model objects, according to some implementations.

FIG. 3 is a block diagram of an example set of semantic model objects 300, according to some implementations. The example includes tables 304, relationships 306, dimensions 308, measures and metrics 310, targets, thresholds, and key performance indicators (KPIs) 312, cubes 314, data link objects (DLOs) 316, data model objects (DMOs) 318, and component integration (CI) 320. In some implementations, each semantic data model is created in the context of a data space and/or is associated with a data space attribute.

Figure 4:
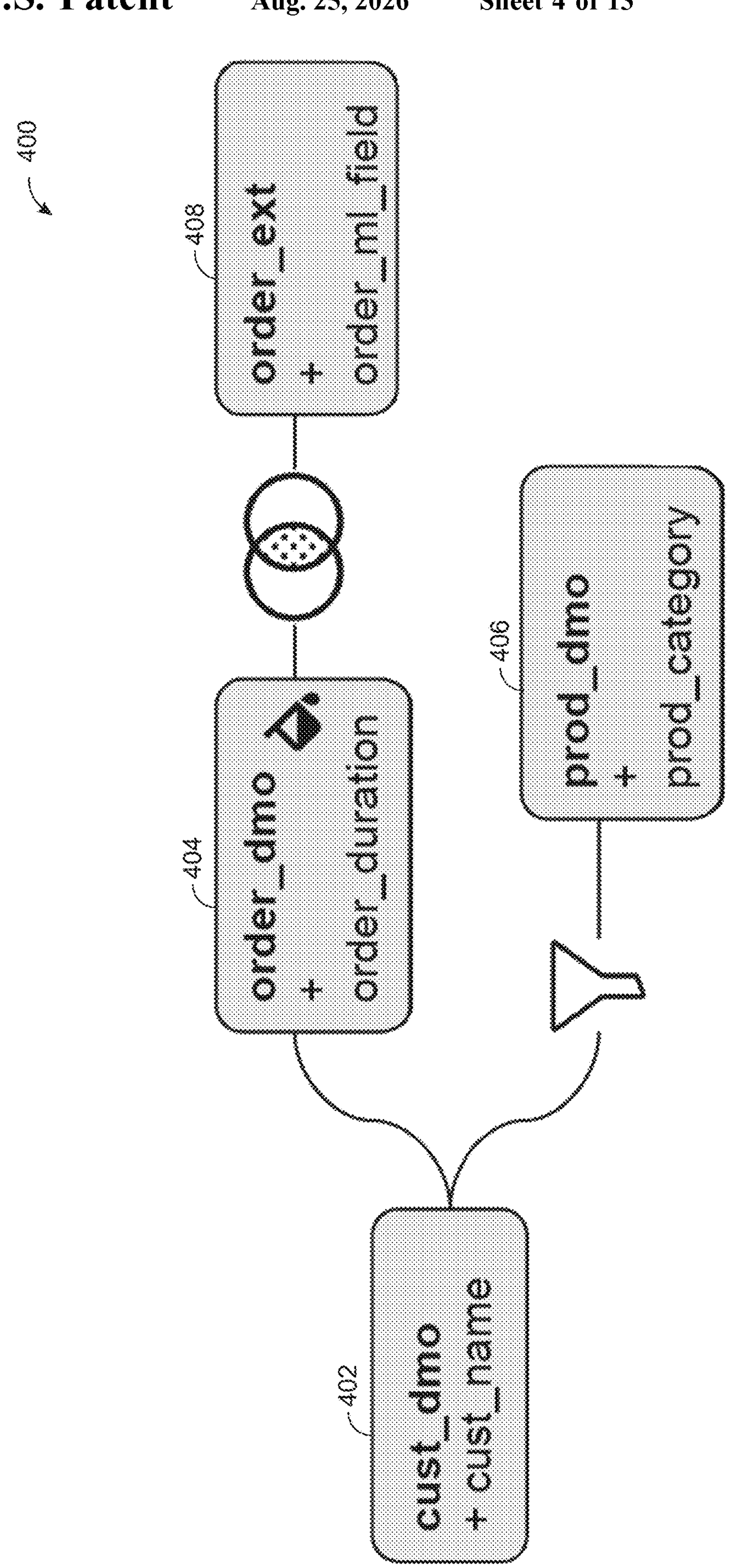
FIG. 4 is an architectural diagram of example data model objects, according to some implementations.

FIG. 4 is an architectural diagram of example data model objects 400, according to some implementations. The diagram shows how different DMOs interact (e.g., in an application, such as an order management system). DMOs are a way of representing high-level data and logic in object-oriented programming, serving as a bridge between the database and the application's logic. The DMO cust_dmo 402 represents a customer DMO, which contains customer-related data, specifically a cust_name field. This DMO would encapsulate, for example, the high-level logic and data handling related to customers. The order_dmo 404 is an order DMO, which includes order_duration as a field. This DMO handles order-related data and processing. The connection between cust_dmo and order_dmo suggests that orders are associated with customers, in a one-to-many relationship where one customer can have multiple orders.

The DMO prod_dmo 406 represents a product DMO containing prod_category information. The funnel symbol connecting the DMO to cust_dmo 402 indicates a filtering or selection mechanism where customers interact with specific product categories. Additional table-level filtering can be applied as columns, calculated fields, and/or as literal calculations. Filters may support group, range, date, and/or geospatial, for example. order_ext 408 is an extension of the order DMO, containing an additional field called order_ml_field. The overlapping circles symbol between order_dmo and order_ext indicates joining or extension relationship, where order_ext adds machine learning-related functionality to the base order DMO. This architectural pattern using DMOs is useful to separate data handling from high-level logic, provides a clear structure for object relationships, makes the system more maintainable by encapsulating related functionality, and creates an abstraction layer between the database and application logic.

Table objects can include physical tables and/or derived tables (e.g., views). Physical tables include, for example, data source tables (e.g., DLOs, DMOs, and/or external entities) and/or materialized tables. Derived tables are defined by filtering or joining multiple tables (e.g., physical tables or other derived tables). Derived tables may be modeled as DMOs. In FIG. 4, cust_dmo table 402 includes order_dmo table 404 inner-joined with order_ext table 408, and includes filtered results from prod_dmo table 406.. In this example, cust_dmo table 402, order_dmo table 404, prod_dmo table 406, and ord_ext table 408 are modeled as physical tables. The ord_ext table 408 is an external table, and it is additionally a table object in the SDM. Because the ord_ext table 408 is an object in the SDM, metadata associated with ord_ext table 408 is captured and stored in a data cloud, according to some implementations. In some implementations, the SDM supports both physical and derived table objects.

Figure 5:
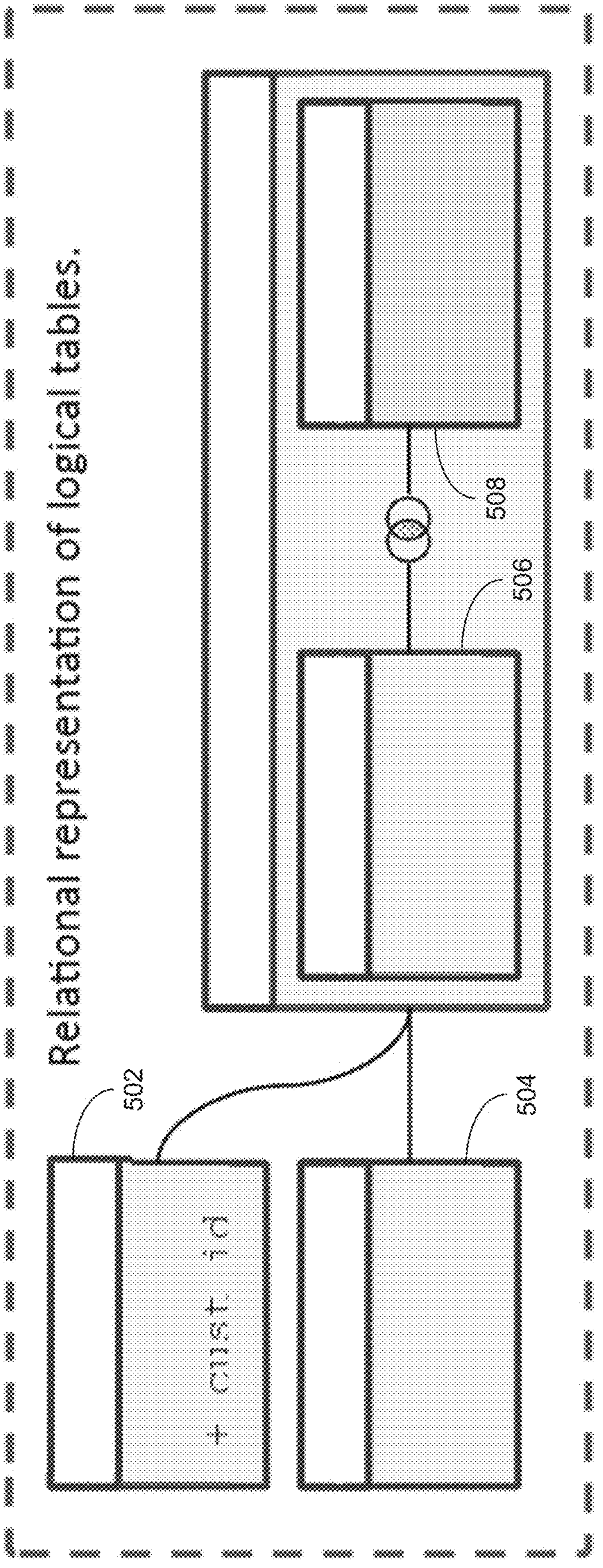
FIG. 5 is a block diagram of an example ad hoc semantic data model, according to some implementations.

FIG. 5 is a block diagram of an example ad-hoc semantic data model 500, according to some implementations. The ad-hoc semantic data model 500 includes table 502 and table 504, both of which are derived tables (e.g., view) based on an inner join of table 506 and table 508. The relational representation of logical tables shows how logical data concepts can be implemented in a relational database structure and helps bridge the gap between conceptual data modeling and actual database implementation. The relationship lines show how data flows between these tables, suggesting that information from source tables can be combined and/or transformed before being joined.

Figure 6:
FIG. 6 is a block diagram of an example curated semantic data model, according to some implementations.
Figure 6:
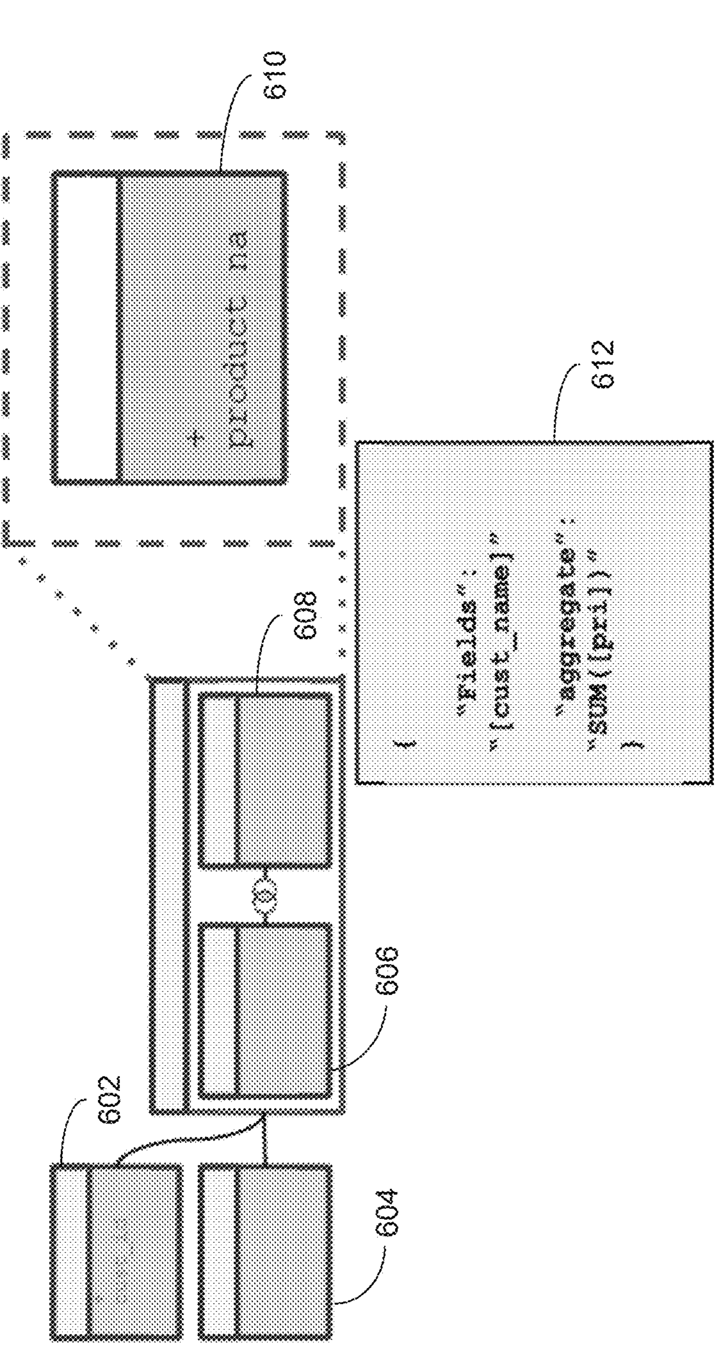

FIG. 6 is a block diagram of an example curated semantic data model 600, according to some implementations. As shown in FIG. 6, the curated semantic data model 600 includes table 602 and table 604, both of which are derived tables (e.g., view) based on a denormalized and aggregated table 610 based on an inner join of table 606 and table 608. For example, as shown in code block 612, a cust_name field is aggregated by summing over a pri field. In some implementations, the curated semantic data model includes a materialized view of a semantic query as a table via a DBT and/or a CI. A curated semantic data model can include denormalized and/or aggregated tables from analysis and/or used for static analytical use cases.

Figure 7:
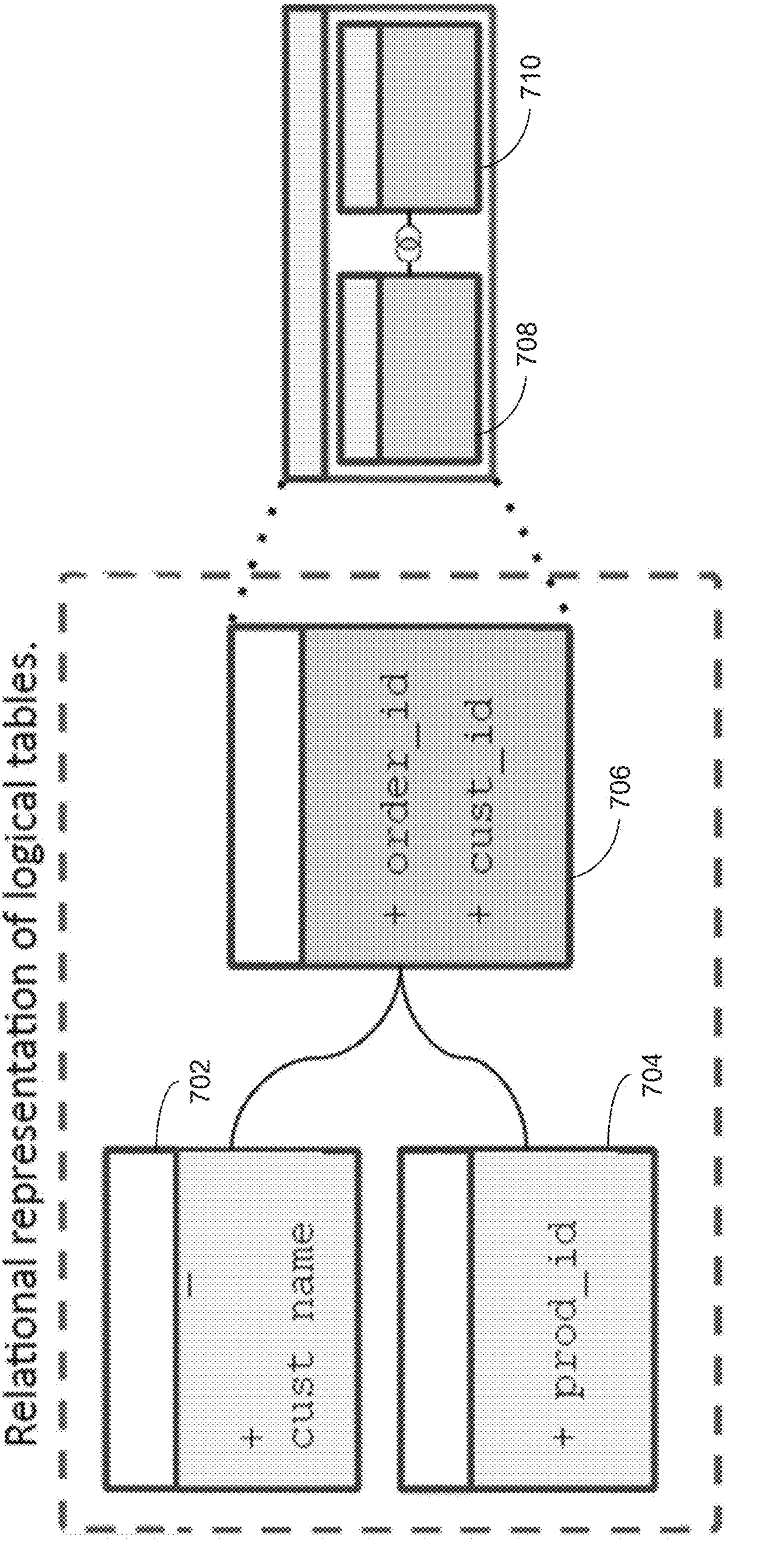
FIG. 7 is a block diagram of an example hybrid semantic data model, according to some implementations.

FIG. 7 is a block diagram of an example hybrid semantic data model 700, according to some implementations. The hybrid semantic data model 700 includes table 702 and table 704, both which are derived tables (e.g., view) based on an inner join of table 708 and table 710. In some implementations, for a hybrid semantic data model 700, one or more normalized tables are denormalized.

Figure 8:
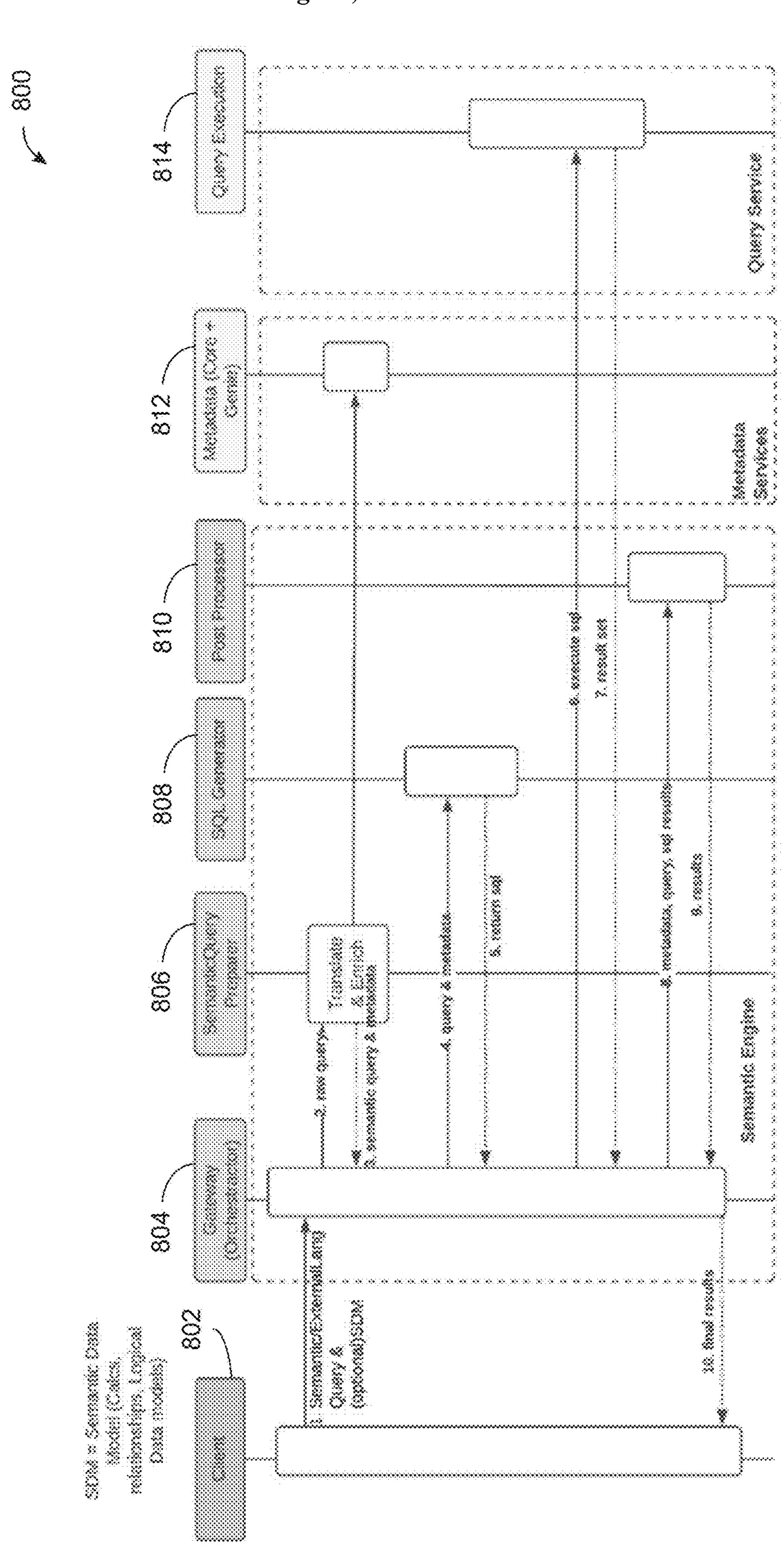
FIG. 8 is a sequence diagram of an example execution by a semantic engine, according to some implementations.

FIG. 8 is a sequence diagram of an example execution 800 by a semantic engine, according to some implementations. A client 802 sends (e.g., in step 1) a semantic query object to a gateway 804 (an orchestrator). The gateway 804 sends (e.g., in step 2) a raw query to a semantic query preparer 806. The semantic query preparer 806 (e.g., in step 3) translates the semantic and/or raw query and enriches it with additional metadata and returns the semantic query and associated metadata to the gateway 804. The metadata may be obtained from a metadata service 812 (which may be in the semantic query service 228). The gateway 804 then sends (e.g., in step 4) the query and associated metadata to an SQL generator 808, which returns (e.g., in step 5) a SQL query to the gateway 804. The gateway 804 sends (e.g., in step 6) the SQL query to a query execution service 814, which executes the SQL query and returns (e.g., in step 7) a result set to the gateway 804. The gateway 804 then sends (e.g., in step 8) the metadata, query and SQL results to a post processor 810, which returns (e.g., in step 9) one or more results to the gateway 804, which in turn sends (e.g., in step 10) the results back to the client 802.

The components shown in FIG. 8 correspond to architectural elements depicted in FIG. 2, according to some implementations. For example, the client 802 represents the various clients 202, such as UAP, Tableau, ISV, CRMA, and Power BI that interact with the semantic processing system. The gateway 804 corresponds to either the semantic design API 206 or semantic engine API 224, which serve as entry points for client requests. The semantic query preparer 806, SQL generator 808, and post processor 810 are subcomponents of the semantic engine 226 shown in FIG. 2, as indicated by the dashed semantic engine boundary in FIG. 8. The metadata services 812 component maps to the semantic meta-store 214 and core database 216 that handle metadata storage and retrieval operations. The query service 814 corresponds to the query service 228 in FIG. 2, responsible for executing the generated SQL queries against the underlying data sources.

Figure 11:
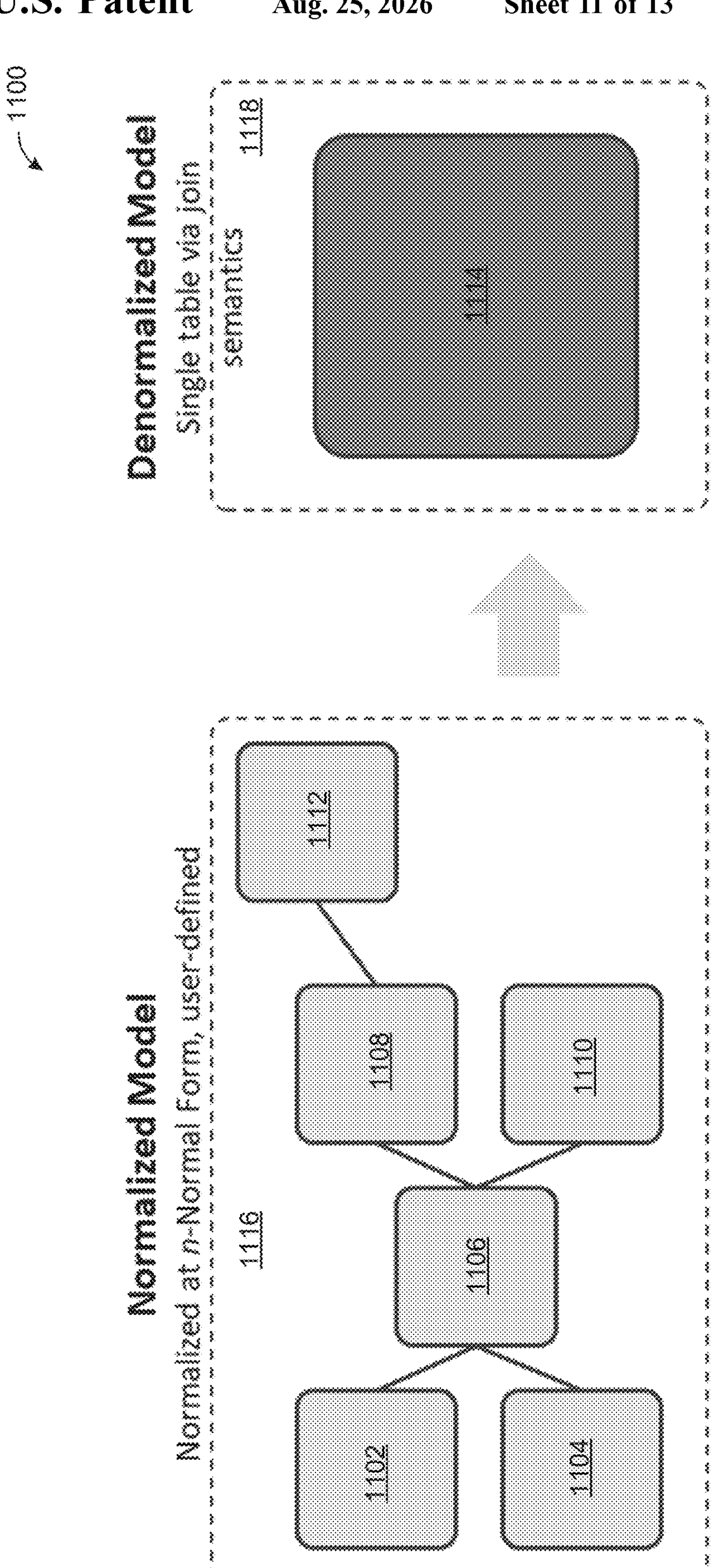
FIG. 11 is a schematic diagram of an example process for converting a normalized model to a denormalized model, according to some implementations.

FIG. 11 is a schematic diagram of an example process 1100 for converting a normalized model 1116 to a denormalized model 1118, according to some implementations. The normalized model includes one or more normalized tables 1102, 1104, 1106, 1108, 1110, and/or 1112. These normalized tables may be federated and/or denormalized through join operations, resulting in a denormalized table 1114 of a denormalized model. Such join operations may cause aggregate table calculations to cause incorrect results while being semantically correct. Additionally, some join operations may result in loss of data in the result set. In some embodiments, conversion to a denormalized model aggregates all measures at a respective native granularity to reduce and/or eliminate duplication of data. Additionally, such conversion can keep measures and dimensions when dimensions and measure, respectively, are added to the denormalized model and/or table. Furthermore, in some embodiments, the denormalized model enables creation of graphs of related table, including aggregation of any number of fact tables to the same shared dimensions. In some implementations, the semantic query preparer 102 (FIG. 1) performs the conversion between normalized and denormalized models. The conversion addresses the technical challenge of maintaining data consistency while providing efficient query performance, aligning with the ability of the system 100 to handle complex calculations without requiring pre-materialization of all combinations.

Figure 12:
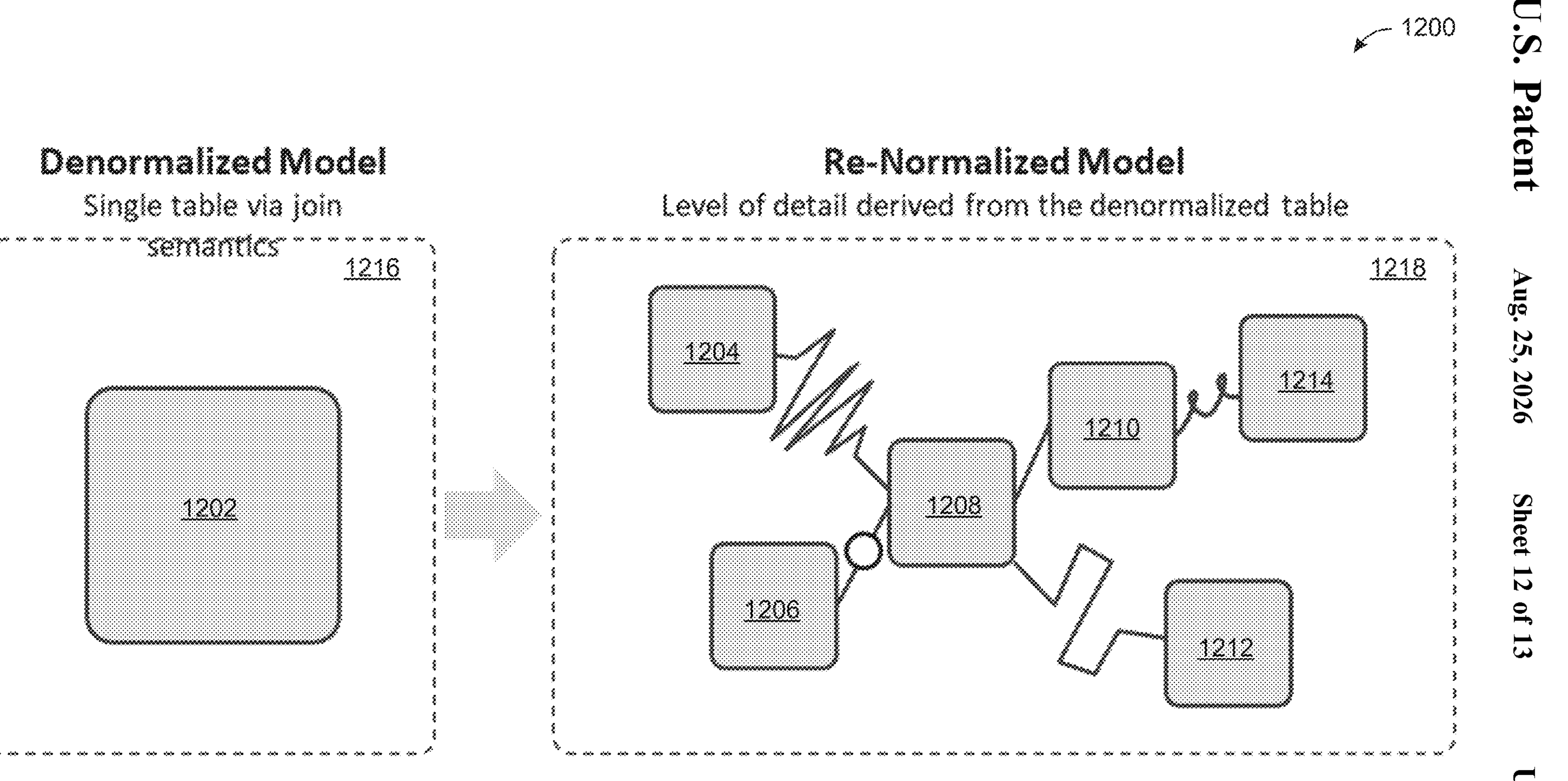
FIG. 12 a schematic diagram of an example process for converting a denormalized model to a re-normalized model, according to some implementations.

FIG. 12 a schematic diagram of an example process 1200 for converting a denormalized model 1216 to a re-normalized model 1218, according to some implementations. The denormalized model includes a table 1202 that (as described above with respect to FIG. 11), which may be generated via one or more join operations and/or semantics. In some implementations, the re-normalization process is executed by the query generator 108, illustrating how the system 100 maintains semantic consistency while transforming data models, supporting the metadata-driven architecture's ability to optimize query execution paths dynamically while preserving high-level logic. In FIG. 12, the single table 1202 (obtained via join semantics) is re-normalized to obtain the re-normalized model 1218 with level(s) of detail derived from the denormalized table 1202, for further analysis.

Figure 13:
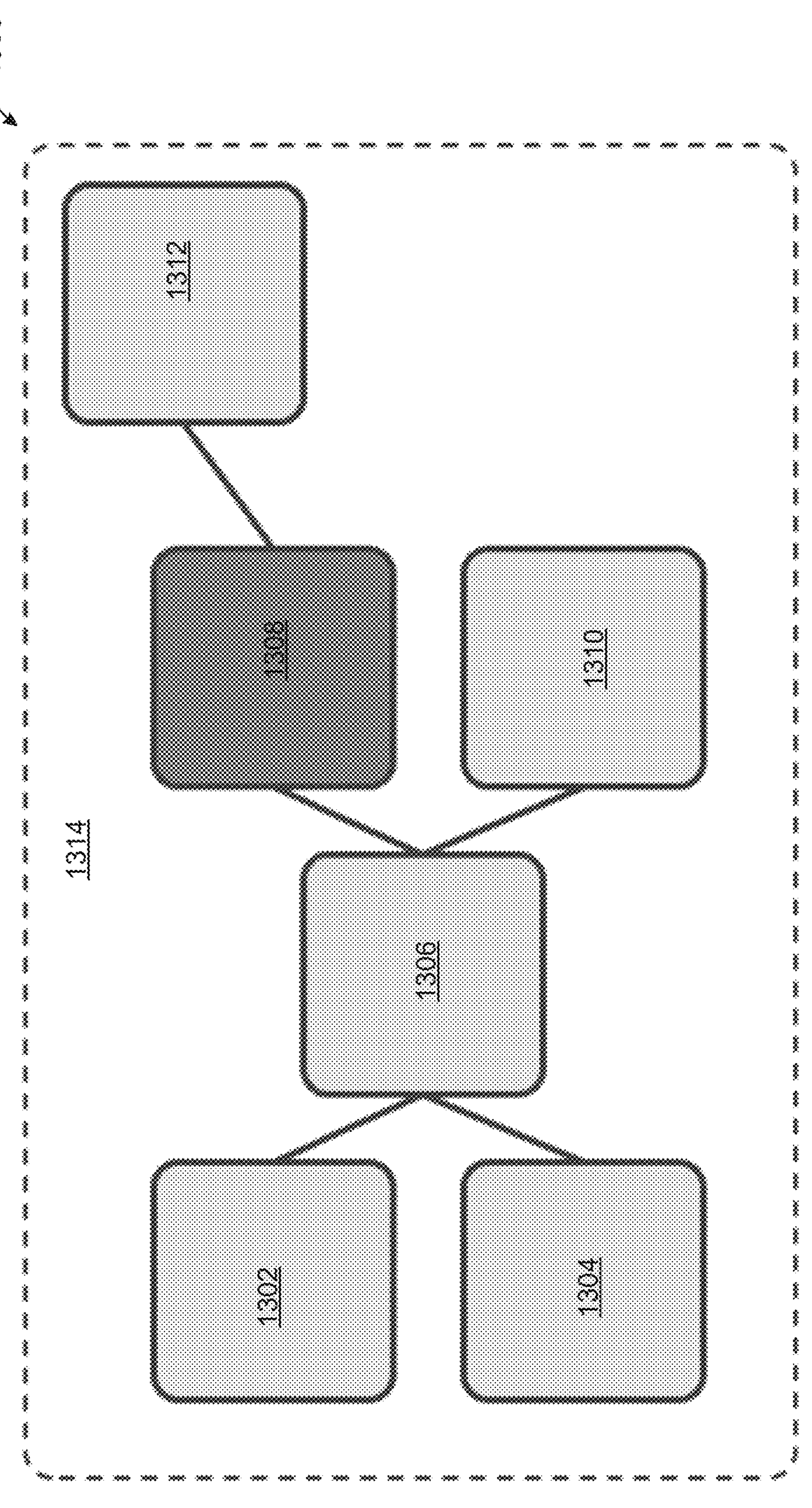
FIG. 13 is a schematic diagram of an example process for analysis on a single view of a normalized model, according to some implementations.

FIG. 13 is a schematic diagram of an example process 1300 for analysis on a single view of a normalized model, according to some implementations. A normalized and/or re-normalized model 1314 may include one or more tables 1302, 1304, 1306, 1308, 1310, and/or 1312. A single table, such as table 1308 (as shown in FIG. 13), may be analyzed. A single table may be analyzed and/or accessed via one or more filters. In some implementations, the SQL query executor manages the analysis on a single view of a normalized model. This process demonstrates how the system 100 can efficiently process queries against specific data subsets while maintaining semantic consistency, showcasing the system's ability to optimize query execution paths without requiring complete data materialization.

Example Computing Device for Semantic Query Processing

Figure 9:
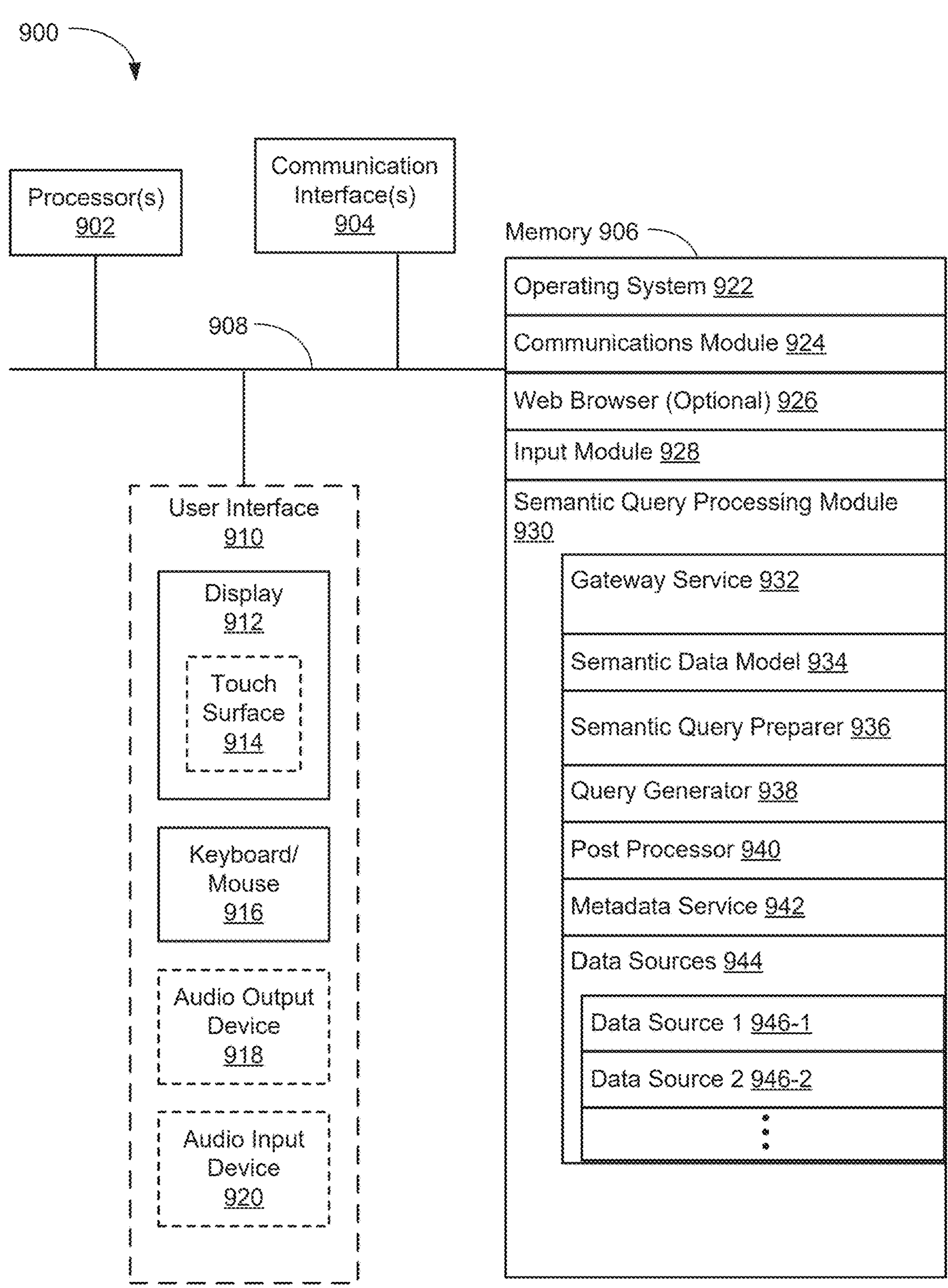
FIG. 9 is a block diagram of an example computing device for semantic query processing, according to some implementations.

FIG. 9 is a block diagram of an example computing device 900 for semantic query processing, according to some implementations. Computing devices 900 include, for example, desktop computers, laptop computers, tablet computers, and other computing devices with a display and a processor capable of running a data visualization application. A computing device 900 typically includes one or more processing units/cores (CPUs) 902 for executing modules, programs, and/or instructions stored in the memory 906 and thereby performing processing operations; one or more network or other communications interfaces 904; memory 906; and one or more communication buses 908 for interconnecting these components. The communication buses 908 may include circuitry that interconnects and controls communications between system components. In some implementations, the computing device 900 includes a user interface 910 comprising a display 912, which may include a touch surface or touch screen display 914, and/or one or more input or output devices or mechanisms (e.g., a keyboard/mouse 916, an audio output device 918, and/or an audio input device 920). In some implementations, the display 912 is an integrated part of the computing device 900. In some implementations, the display is a separate display device. The input devices or mechanisms can be used to provide raw and/or semantic queries directed to data sources 944.

In some implementations, the memory 906 includes high-speed random-access memory, such as DRAM, SRAM, DDR RAM, or other random-access solid-state memory devices. In some implementations, the memory 906 includes non-volatile memory, such as one or more magnetic disk storage devices, optical disk storage devices, flash memory devices, or other non-volatile solid-state storage devices. In some implementations, the memory 906 includes one or more storage devices remotely located from the processors 902. The memory 906, or alternatively the non-volatile memory devices within the memory 906, includes a non-transitory computer-readable storage medium. In some implementations, the memory 906, or the computer-readable storage medium of the memory 906, stores the following programs, modules, and data structures, or a subset thereof:

- an operating system 922, which includes procedures for handling various basic system services and for performing hardware dependent tasks;
- a communication module 924, which is used for connecting the computing device 900 to other computers and devices via the one or more communication network interfaces 904 (wired or wireless) and one or more communication networks, such as the Internet, other wide area networks, local area networks, metropolitan area networks, and so on;
- an optional web browser 926 (or other client application), which enables a user to communicate over a network with remote computers or devices;

an input module 928 to process input and/or signals received from the user interface 910, and/or output signals to output devices in the user interface 910;

a semantic query processing module 930, which includes a gateway service 932, semantic data model 936, semantic query preparer 938, query generator 940, a post processor 940, and a metadata service 942, and/or zero or more databases or data sources 944 (e.g., a first data source 946-1 and/or a second data source 946-2), which are used by the module 930. In some implementations, the data sources are stored as spreadsheet files, CSV files, XML files, flat files, JSON files, tables in a relational database, cloud databases, or statistical databases.

In addition to the modules and/or data structures described above, the memory 906 stores additional modules and data structures that may be necessary for performing the operations described in reference to FIGS. 1-8, and FIGS. 10-13, even if not explicitly described herein. Each of the above identified executable modules, applications, or set of procedures may be stored in any of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 906 stores a subset of the modules and data structures identified above. In some implementations, the memory 906 stores additional modules or data structures not described above. Although FIG. 9 shows a computing device 900, FIG. 9 is intended more as a functional description of the various features that may be present rather than as a structural schematic of the implementations described herein. In practice, and as recognized by those of ordinary skill in the art, items shown separately could be combined and some items could be separated.

Each of the above identified executable modules, applications, or sets of procedures may be stored in one or more of the identified memory devices and corresponds to a set of instructions for performing a function described above. The modules or programs (i.e., sets of instructions) need not be implemented as separate software programs, procedures, or modules, and thus various subsets of these modules may be combined or otherwise re-arranged in various implementations. In some implementations, the memory 906 stores a subset of the modules and data structures identified above. Furthermore, the memory 906 may store additional modules or data structures not described above.

Example Method for Semantic Query Processing

Figure 10:
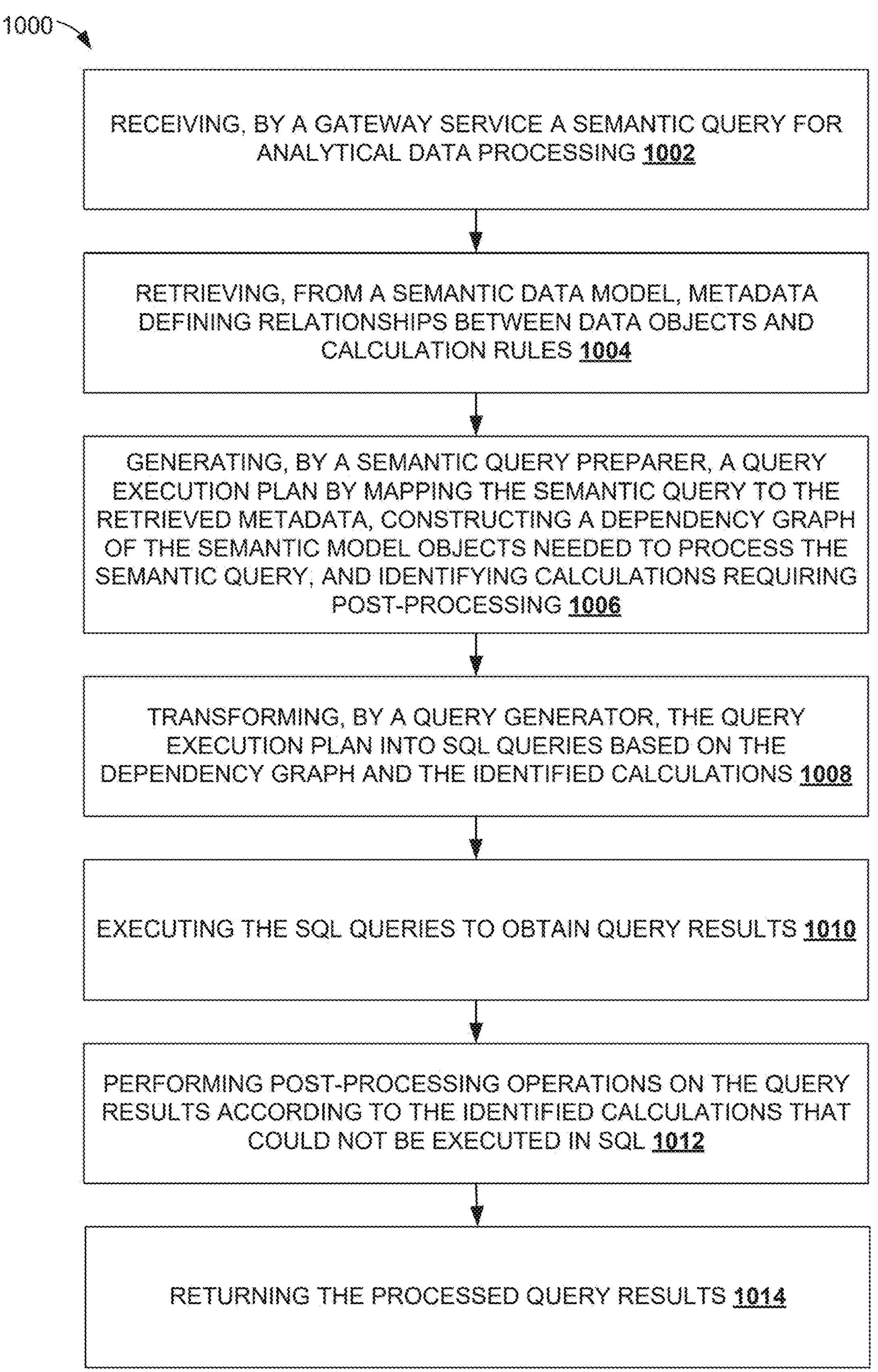
FIG. 10 is a flowchart of an example method for semantic query processing, according to some implementations.

FIG. 10 is a flowchart of an example method 1000 for semantic query processing, according to some implementations. The method 1000 can be performed by a semantic query processing system (e.g., the system 100) or modules of the computing device 900 described above. In accordance with some implementations, the method 1000 executes at a computing device having one or more processors, and memory storing one or more programs configured for execution by the one or more processors. The method for processing semantic queries includes receiving (1002), by a gateway service (e.g., the gateway service 104), a semantic query (e.g., the semantic query 103) for analytical data processing. The method also includes retrieving (1004) metadata from a semantic data model (e.g., the semantic data model 106) that defines relationships between data objects (e.g., the physical model objects 212) and calculation rules. The semantic data model includes semantic model objects (e.g., the semantic model objects 210) storing definitions for table relationships, measures, and dimensions. The method also includes generating (1006), by a semantic query preparer (e.g., the semantic query preparer 102), a query execution plan through several steps. The semantic query preparer maps the semantic query to the retrieved metadata. The semantic query preparer also constructs a dependency graph of the semantic model objects needed to process the semantic query. The semantic query preparer also identifies calculations requiring post-processing. The method also includes transforming (1008), by a query generator, the query execution plan into SQL queries based on the dependency graph and the identified calculations. The method also includes executing (1010) the SQL queries to obtain query results. The method also includes performing (1012) post-processing operations on the query results according to the identified calculations that could not be executed in SQL. The method also includes returning (1014) the processed query results (e.g., the processed query results 114).

In some implementations, generating the query execution plan includes analyzing the semantic query to identify required tables. The method also includes traversing (e.g., by the semantic query preparer 102, as shown in FIG. 1) the dependency graph to determine an optimal join order. The method also includes identifying measures requiring pre-aggregation. The method also includes determining aggregation levels based on dimension hierarchies.

In some implementations, determining the optimal join sequence includes analyzing cardinality information from the retrieved metadata (e.g., from the semantic data model 106 as shown in FIG. 1 and/or the semantic meta store 214, as shown in FIG. 2). The method also includes evaluating filter selectivity. In some implementations, the method also includes generating a cost-based join path through the dependency graph. In some implementations, generating a cost-based join path includes assigning numeric weights to potential join paths based on cardinality ratios between joined tables and the selectivity of applied filters. The system 100 evaluates each possible join sequence using these weights to determine the optimal order that minimizes data movement and intermediate result set sizes. For example, joins with high cardinality ratios (e.g., one-to-many relationships) are weighted higher than one-to-one relationships, and/or selective filters reduce the path cost proportionally to their selectivity factor.

In some implementations, transforming the query execution plan includes generating FROM clauses based on the dependency graph (e.g., by the semantic engine 226, as shown in FIG. 2). The method also includes generating SELECT clauses incorporating measure calculations. The method also includes generating GROUP BY clauses based on dimension hierarchies. The method also includes optimizing the SQL queries based on database capabilities.

In some implementations, transforming the query execution plan includes generating subqueries for identified complex measure calculations (e.g., by the semantic engine 226, as shown in FIG. 2). The method also includes ordering the subqueries based on measure dependencies. The method also includes incorporating the subquery results into final SQL generation.

In some implementations, performing post-processing operations includes executing complex analytical functions not supported by SQL (e.g., by query service 228, as shown in FIG. 2). The method also includes performing multi-pass calculations requiring intermediate results. The method also includes applying hierarchical rollups across dimensions. The method also includes formatting results according to measure definitions.

In some implementations, retrieving metadata includes accessing a metadata store (e.g., the semantic meta store 214, as shown in FIG. 2) containing semantic model object definitions. The method also includes loading relationship definitions specifying join conditions between tables. The method also includes loading measure definitions specifying calculation formulas and aggregation rules. The method also includes loading dimension definitions specifying hierarchical grouping structures.

In some implementations, the relationship definitions include source and target table identifiers. The relationship definitions also include source and target column identifiers. The relationship definitions also include join type specifications. The relationship definitions also include cardinality information. The relationship definitions also include referential integrity constraints.

In some implementations, the measure definitions include base measures identifying source columns. The measure definitions also include calculated measures specifying arithmetic formulas. The measure definitions also include aggregation rules specifying summation methods. The measure definitions also include granularity specifications identifying valid dimension combinations.

In some implementations, the dimension definitions include creating dimension hierarchies based on the retrieved metadata. The method also includes associating hierarchies with corresponding measures. The method also includes validating aggregation paths through the dependency graph. The method also includes generating level-based aggregation instructions.

In some implementations, executing multi-pass calculations includes storing intermediate results from SQL query execution. The method also includes applying subsequent calculation passes based on measure definitions. The method also includes maintaining calculation context across processing steps. The method also includes aggregating the results according to dimension hierarchies.

In some implementations, maintaining calculation context includes tracking measure aggregation states. The calculation context also includes preserving dimension hierarchy positions. The calculation context also includes managing running calculations across result sets.

In some implementations, the method includes monitoring execution metrics during query processing. The method also includes storing metrics in an execution statistics repository. The method also includes using stored metrics to optimize subsequent query execution plans. In some implementations, optimizing subsequent query execution plans includes analyzing cached execution statistics. The method also includes modifying join sequences based on actual performance. The method also includes adjusting calculation ordering based on observed costs. In some implementations, optimizing query execution plans using cached statistics includes maintaining a repository of execution metrics including average query runtime, memory usage, and/or data volume processed for each query pattern. The system 100 analyzes these metrics to identify performance bottlenecks and/or adjusts join sequences and calculation ordering accordingly. Observed costs can include specific metrics, such as I/O operations, memory consumption, and/or processing time for each query component, which may be used to refine future execution plans.

In some implementations, the method includes validating security permissions before metadata retrieval. The method also includes applying security filters during query transformation. The method also includes maintaining security context through post-processing. In some implementations, maintaining security context through post-processing includes propagating user authorization tokens and access control lists through each processing stage. In some implementations, the system validates these security contexts before executing calculations and applies row-level and column-level security filters consistently across both SQL execution and post-processing operations. In some implementations, security filters are maintained as part of the query execution context and are automatically applied to intermediate results and final output.

In some implementations, the semantic model objects (e.g., the semantic model objects 210, as shown in FIG. 2) include versioned metadata definitions stored in a data cloud. The semantic model objects also include cached transformation rules used by the query generator. The semantic model objects also include runtime execution contexts maintained by the semantic engine. In some implementations, runtime execution contexts maintain specific state information including, for example, current aggregation level for each measure being calculated, position within dimension hierarchies for rollup operations, intermediate results at each calculation stage, and/or progress indicators for multi-pass calculations. In some implementations, the system 100 persists this state information throughout query execution to ensure consistent handling of complex calculations and proper aggregation sequencing. Calculation states can track which operations have completed and which are pending, enabling proper orchestration of dependent calculations.

In some implementations, the runtime execution contexts include tracking active calculation states. The runtime execution contexts also include tracking intermediate result sets. The runtime execution contexts also include tracking dimension hierarchy positions. The runtime execution contexts also include tracking aggregation progress through query execution plan.

In some implementations, the semantic query (e.g., the semantic query 103, as shown in FIG. 1) includes measure identifiers corresponding to measure definitions. The semantic query also includes dimension paths specified according to dimension hierarchies. The semantic query also includes filter conditions applicable to the data objects. The semantic query also includes output specifications for processed query results.

Example Semantic Processing System and Process Flow

Referring to FIG. 1, in some implementations, the semantic query processing system 100 optimizes query execution through metadata-driven processing and dynamic computation. The system 100 stores execution metrics from the SQL query executor 110 in a statistics repository to improve future query performance. Each query's runtime performance, memory usage, and/or data volume metrics can help identify bottlenecks and refine execution strategies. In some implementations, the system 100 propagates security context from the gateway service 104 throughout processing by maintaining user authorization tokens and access control lists across execution stages.

In some implementations, the system 100 validates security contexts through the gateway service 104 before executing calculations and applies consistent security filters across both SQL query executor 110 and post processor 112 operations. The semantic query preparer 102 assigns numeric weights to potential join paths based on cardinality ratios between joined tables and filter selectivity. The semantic query preparer 102 evaluates possible join sequence using these weights to determine the order that minimizes data movement and intermediate result sizes.

In some implementations, the system 100 maintains specific state information in the semantic data model 106 including the current aggregation level for measures, position within dimension hierarchies for rollup operations, intermediate results at each calculation stage, and progress indicators for multi-pass calculations. This state information persists throughout query execution to ensure consistent handling of complex calculations and proper aggregation sequencing. The post processor 112 tracks which operations have completed, and which are pending, enabling proper orchestration of dependent calculations.

In some implementations, the system 100 uses a repository of execution metrics including average query runtime, memory usage, and/or data volume processed for each query pattern to optimize performance. The query generator 108 analyzes these metrics to identify performance bottlenecks and adjusts join sequences and calculation ordering accordingly. Observed costs include, for example, specific metrics like I/O operations, memory consumption, and processing time for each query component, which refine future execution plans. The gateway service 104 validates these security contexts before executing calculations and applies row-level and column-level security filters consistently across both SQL query executor 110 and post processor 112 operations.

To illustrate how the system processes queries end-to-end, consider an analyst requesting "Show me customer profitability by region for 2024." In some implementations, the gateway service 104 receives this semantic query and forwards it to the semantic query preparer 102. The preparer 102 retrieves metadata from the semantic data model 106 that defines how customer, order, and region tables relate, and what calculations are needed for profitability. The preparer 102 builds a dependency graph showing that profitability requires revenue and cost calculations, which in turn need order data joined with customer and region information.

Subsequently, in some implementations, the query generator 108 transforms this graph into optimized SQL queries, fetching base measures like revenue and cost. The SQL query executor 110 runs these queries against the underlying data store. Since profitability calculation cannot be expressed in pure SQL, the post processor 112 performs the final computation of (revenue−cost)/revenue for each region. Throughout execution, the system 100 maintains calculation context to ensure consistent aggregation and results. The gateway service 104 then returns the processed results showing profitability percentages across regions. This example demonstrates how the system 100 coordinates its components to translate a high-level question into technical operations while maintaining semantic consistency and optimization.

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc.

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set of time intervals or in real time based on resulting output or additional data to further train the AI technology. The AI technology may offer a variety of capabilities including text, audio, image, or content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

Each of the above identified executable modules, applications, or sets of procedures may be stored in one or more of the identified memory devices and corresponds to a set of instructions for performing a function described above. The modules or programs (i.e., sets of instructions) need not be implemented as separate software programs, procedures, or modules, and thus various subsets of these modules may be combined or otherwise re-arranged in various implementations. In some implementations, the memory 206 and/or 264 stores a subset of the modules and data structures identified above. Furthermore, the memory 206 and/or 264 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for processing semantic queries, comprising:
receiving, by a gateway service, a semantic query for analytical data processing;
retrieving, from a semantic data model, metadata defining relationships between data objects and calculation rules, wherein the semantic data model comprises semantic model objects storing definitions for table relationships, measures, and dimensions;
generating, by a semantic query preparer, a query execution plan, including:
determining (a) one or more measure calculations that are supported by Structured Query Language (SQL) queries and (b) one or more analytical functions that cannot be executed in SQL and requiring post-processing;
mapping the semantic query to the retrieved metadata; and
constructing a dependency graph of the semantic model objects needed to process the semantic query;
transforming, by a query generator, the query execution plan into SQL queries based on the dependency graph and the one or more measure calculations;
executing the SQL queries for the one or more measure calculations to obtain query results;
performing post-processing operations, including executing the one or more analytical functions according to (i) the query results obtained by executing the SQL queries and (ii) the retrieved metadata; and
returning, by the gateway service, the processed query results.

2. The method of claim 1, wherein generating the query execution plan comprises:
analyzing the semantic query to identify required tables;
traversing the dependency graph to determine an optimal join order;
identifying measures requiring pre-aggregation; and
determining aggregation levels based on dimension hierarchies.

3. The method of claim 2, wherein determining the optimal join sequence comprises:
analyzing cardinality information from the retrieved metadata;
evaluating filter selectivity; and
generating a cost-based join path through the dependency graph.

4. The method of claim 1, wherein transforming the query execution plan comprises:
generating FROM clauses based on the dependency graph;
generating SELECT clauses incorporating the one or more measure calculations;
generating GROUP BY clauses based on dimension hierarchies; and
optimizing the SQL queries based on database capabilities.

5. The method of claim 4, wherein transforming the query execution plan comprises:
generating subqueries for the one or more measure calculations;
ordering the subqueries based on measure dependencies; and
incorporating the subquery results into final SQL generation.

6. The method of claim 1, wherein performing post-processing operations comprises:
performing multi-pass calculations requiring intermediate results;
applying hierarchical rollups across dimensions; and
formatting results according to measure definitions.

7. The method of claim 1, wherein retrieving metadata comprises:
accessing a metadata store containing semantic model object definitions;
loading relationship definitions specifying join conditions between tables;
loading measure definitions specifying calculation formulas and aggregation rules; and
loading dimension definitions specifying hierarchical grouping structures.

8. The method of claim 7, wherein the relationship definitions comprise:
source and target table identifiers;
source and target column identifiers;
join type specifications;
cardinality information; and
referential integrity constraints.

9. The method of claim 7, wherein the measure definitions comprise:
base measures identifying source columns;
calculated measures specifying arithmetic formulas;
aggregation rules specifying summation methods; and
granularity specifications identifying valid dimension combinations.

10. The method of claim 7, wherein the dimension definitions comprise:
creating dimension hierarchies based on the retrieved metadata;
associating hierarchies with corresponding measures;
validating aggregation paths through the dependency graph; and
generating level-based aggregation instructions.

11. The method of claim 7, wherein executing multi-pass calculations comprises:
storing intermediate results from SQL query execution;
applying subsequent calculation passes based on measure definitions;
maintaining calculation context across processing steps; and
aggregating the results according to dimension hierarchies.

12. The method of claim 11, wherein maintaining calculation context comprises:
tracking measure aggregation states;
preserving dimension hierarchy positions; and
managing running calculations across result sets.

13. The method of claim 1, further comprising:
monitoring execution metrics during query processing;
storing metrics in an execution statistics repository; and
using stored metrics to optimize subsequent query execution plans.

14. The method of claim 13, wherein optimizing subsequent query execution plans comprises:
analyzing cached execution statistics;
modifying join sequences based on actual performance; and
adjusting calculation ordering based on observed costs.

15. The method of claim 1, further comprising:
validating security permissions before metadata retrieval;
applying security filters during query transformation; and
maintaining security context through post-processing.

16. The method of claim 1, wherein the semantic model objects comprise:

versioned metadata definitions stored in a data cloud;

cached transformation rules used by the query generator; and runtime execution contexts maintained by a semantic engine.

17. The method of claim 16, wherein the runtime execution contexts track:

active calculation states;

intermediate result sets;

dimension hierarchy positions; and aggregation progress through query execution plan.

18. The method of claim 1, wherein the semantic query comprises:

measure identifiers corresponding to measure definitions;

dimension paths specified according to dimension hierarchies;

filter conditions applicable to the data objects; and output specifications for processed query results.

19. A computer system for processing semantic queries, comprising:

one or more processors; and memory, wherein the memory stores one or more programs configured for execution by the one or more processors, and the one or more programs comprising instructions for:

receiving, by a gateway service, a semantic query for analytical data processing;

retrieving, from a semantic data model, metadata defining relationships between data objects and calculation rules, wherein the semantic data model comprises semantic model objects storing definitions for table relationships, measures, and dimensions;

generating, by a semantic query preparer, a query execution plan, including:

determining (a) one or more measure calculations that are supported by Structured Query Language (SQL) queries and (b) one or more analytical functions that cannot be executed in SQL and requiring post-processing;

mapping the semantic query to the retrieved metadata; and constructing a dependency graph of the semantic model objects needed to process the semantic query;

transforming, by a query generator, the query execution plan into SQL queries based on the dependency graph and the one or more measure calculations;

executing the SQL queries for the one or more measure calculations to obtain query results;

performing post-processing operations, including executing the one or more analytical functions according to (i) the query results obtained by executing the SQL queries and (ii) the retrieved metadata; and returning the processed query results.

20. A non-transitory computer readable storage medium storing one or more programs configured for execution by a computer system having a display, one or more processors, and memory, the one or more programs comprising instructions for:

receiving, by a gateway service, a semantic query for analytical data processing;

retrieving, from a semantic data model, metadata defining relationships between data objects and calculation rules, wherein the semantic data model comprises semantic model objects storing definitions for table relationships, measures, and dimensions;

generating, by a semantic query preparer, a query execution plan, including:

determining (a) one or more measure calculations that are supported by Structured Query Language (SQL) queries and (b) one or more analytical functions that cannot be executed in SQL and requiring post-processing;

mapping the semantic query to the retrieved metadata; and constructing a dependency graph of the semantic model objects needed to process the semantic query;

transforming, by a query generator, the query execution plan into SQL queries based on the dependency graph and the one or more measure calculations;

executing the SQL queries for the one or more measure calculations to obtain query results;

performing post-processing operations, including executing the one or more analytical functions according to (i) the query results obtained by executing the SQL queries and (ii) the retrieved metadata; and returning the processed query results.

* * * * *